(12) United States Patent
Mihan et al.

(10) Patent No.: US 7,999,043 B2
(45) Date of Patent: Aug. 16, 2011

(54) MULTISTAGE PROCESS FOR THE POLYMERIZATION OF OLEFINS

(75) Inventors: Shahram Mihan, Bad Soden (DE); Eleonora Ciaccia, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/735,218

(22) PCT Filed: Dec. 23, 2008

(86) PCT No.: PCT/EP2008/011082
§ 371 (c)(1),
(2), (4) Date: Sep. 3, 2010

(87) PCT Pub. No.: WO2009/080359
PCT Pub. Date: Jul. 2, 2009

(65) Prior Publication Data
US 2011/0003948 A1 Jan. 6, 2011

(30) Foreign Application Priority Data
Dec. 24, 2007 (EP) .................................... 07025087

(51) Int. Cl.
C08F 4/70 (2006.01)
C08F 10/00 (2006.01)
(52) U.S. Cl. ......................... 526/65; 526/115
(58) Field of Classification Search .................. 526/65, 526/115
See application file for complete search history.

(56) References Cited

FOREIGN PATENT DOCUMENTS

| EP | 1057834 B1 | 3/2006 |
|---|---|---|
| WO | WO 95/11264 | 4/1995 |
| WO | WO 96/00243 | 1/1996 |
| WO | WO 97/04015 | 2/1997 |
| WO | WO 98/27124 | 6/1998 |
| WO | WO 98/40419 | 9/1998 |
| WO | WO 99/12981 | 3/1999 |
| WO | WO 99/46302 | 9/1999 |
| WO | WO 99/50318 | 10/1999 |
| WO | WO 00/05277 | 2/2000 |
| WO | WO 00/24787 | 5/2000 |
| WO | WO 00/31090 | 6/2000 |
| WO | WO 00/50466 | 8/2000 |
| WO | WO 02/24768 | 3/2002 |
| WO | WO 2005/103096 | 11/2005 |
| WO | WO 2007042252 A1 * | 4/2007 |
| WO | WO 2007/059867 | 5/2007 |

OTHER PUBLICATIONS

Jennifer Scott, Sandro Gambarotta, Llia Korobkov, and Peter H. M. Budzelaar, "Metal versus Ligand Alkylation in the Reactivity of the (Bis-iminopyridinato)Fe Catalyst," *J. A. Chem. Soc.*, 2005, 127, pp. 13019-13029.
M. Ratzsch, W. Neissl, "Bimodale Polymerwerkstoffe auf der Basis von PP and PE," *Aufbereiten von Polymeren mit neuartigen Eigenschaften*, VDI-Verlag, Dussseldorf, 1995, pp. 3-25.
Steven H. Strauss, "The Search for Larger and More Weakly Coordinating Anions," *Chem Rev.*, 1993, pp. 927-942.
Brooke L. Small, Maurice Brookhart, and Alison M. A. Bennett, "Highly Active Iron and Cobalt Catalysts for the Polymerization of Ethylene," *J. Am Chem. Soc.*, 1998, 120, pp. 4049-4050.
George J. P. Britovsek, Vernon C. Gibson, Brian S. Kimberley, Peter J. Maddox, Stuart J. McTavish, Gregory A. Solan, Andrew J. P. White, and David J. Williams, "Novel olefin polymerization catalysts based on iron and cobalt," *J. Chem Soc., Chem. Commun.*, 1998, p. 849.
K. D. Hungenberg, J. Kerth, F. Langhauser, B. Marczinke, and R. Schlund, "Gas Phase Polymerization of x-Olefins with Ziegler-Natta and Metallocene Catalysts: a Comparison," *Ziegler Catalysts*, Fink/Mulhaupt/Brintzinger (Eds.), Springer-Verlag Berlin Heidelberg, 1995, pp. 363-386.
James C. Randall, "A Review of High Resolution Liquid Carbon Nuclear Magnetic Resonance Characterizations of Ethylene-Based Polymers," *JMS-Rev. Macromol. Chem. Phys.*, C29(2&3), 1989, pp. 201-317.
H. Benoit, P. Rempp, and Z. Grubisic, "A Universal Calibration for Gel Permeation Chromatography," *J. Polymer Sci.*, Phys. Ed., Polymer Letters, vol. 5, 1967, pp. 753-759.

* cited by examiner

Primary Examiner — Kelechi C Egwim
(74) Attorney, Agent, or Firm — Dilworth IP, LLC

(57) ABSTRACT

A multistage process for the homo or copolymerization of ethylene carried out in the presence of a catalyst system comprising at least one polymerization catalyst (A) based on a late transition metal component having a tridentate ligand which bears at least two ortho.ortho-disubstituted aryl radicals, at least one Ziegler polymerization catalyst (B), and at least a Lewis acid activating compound (C), wherein the molar ratio of the metal of the activating compound (C) to the late transition metal of catalyst (A) is different in the two polymerizations steps. Catalysts (A) and (B) may be selectively controlled by varying the amount of activating compound (C).

20 Claims, No Drawings

MULTISTAGE PROCESS FOR THE POLYMERIZATION OF OLEFINS

CROSS-REFERENCE TO RELATED APPLICATIONS

This application is the U.S. national stage under 35 U.S.C. §371 of International Application PCT/EP2008/011082, filed Dec. 23, 2008, claiming priority to EP Patent Application No. 07025087.3, filed Dec. 24, 2007; the disclosures of International Application PCT/EP2008/011082 and EP Patent Application No. 07025087.3, each as filed, are incorporated herein by reference.

FIELD OF THE INVENTION

The present invention concerns a multistage process for the polymerization of olefins carried out in the presence of at least one polymerization catalyst based on a late transition metal component having a tridentate ligand, at least one Ziegler polymerization catalyst, and at least an activating compound.

BACKGROUND OF THE INVENTION

Multimodal polyethylenes are widely used in the art in various applications, such as fibers, moldings, films and pipes, in view of the improved properties that they exhibit over monomodal polyethylenes. Multimodal polyethylenes present molecular weight distribution curves having more than one molecular weight peak, due to the presence of a plurality of polymer fractions having different molecular weights; in view of their broader molecular weight distribution, multimodal polyethylenes can also be processed more easily with respect to monomodal polyethylenes.

Various methods are known in the art to produce multimodal polyethylene, including post reactor melt blending, single stage processes carried out in the presence of a catalyst system comprising a mixture of different catalysts, and multistage processes. The method used determines the properties of the polyethylene, in that the properties of a multimodal polyethylene depend not only on the properties of the single polymer fractions thereof, but also by the quality of the mixing of these fractions. A poor mixing quality results, inter alia, in a low stress cracking resistance and adversely affects the creep behaviour of articles made of such polyethylenes.

Melt blending techniques, commonly carried out in an extruder, are expensive, cumbersome and time consuming; moreover, the mixing quality of the fractions is not sufficient for many applications.

Alternatively, multimodal polyethylene may be produced in a single reactor by using catalyst systems comprising at least two different ethylene polymerization catalysts, able to produce polyethylene fractions having different molecular weight.

Various families of polymerization catalysts are known in the art, such as Ziegler catalysts, metallocene catalysts and the more recently developed transition metal complexes comprising ligands other than cyclopentadienyl. For instance, WO 98/27124 discloses 2,6-bis(imino)pyridyl complexes of iron and cobalt as catalysts for homo- or co-polymerization of ethylene. *J. Am. Chem. Soc.* 127, 13019-13029 (2005) describes the preparation of several bis-iminopyridinato Ziegler catalysts and their activities in the polymerization of ethylene.

Catalyst mixtures comprising different active centres have been described in the prior art to prepare polymers having broader distributions in processes using a single reactor. For instance, the use of catalyst compositions comprising at least two different ethylene polymerization catalysts of the Ziegler type or the metallocene type is described for instance in WO 95/11264, which discloses the use of a combination of such catalysts to produce a polyethylene having a broad molecular weight distribution.

WO 99/46302 describes a catalyst composition for the polymerization of alpha-olefins comprising a 2,6-bis(imino) pyridyl iron catalyst and another catalyst, such as a zirconocene or a Ziegler catalyst; WO 05/103096 discloses a catalyst composition comprising a 2,6-bis(imino)pyridyl iron catalyst and a hafnocene catalyst.

The above documents describe the use of a mixed catalyst system in a single polymerization step. However, in the continuous polymerization of olefins using hybrid catalysts in a single reactor, there is the problem that the properties of the polymers obtained significantly on the ratio of the active centres present. Fluctuations in the composition of different batches of hybrid catalysts used can thus lead to different proportions of the polymer components formed by the individual catalyst components. Moreover, catalyst aging, in particular if one of the components is more sensitive than the other(s), can also result in different products even when the same batch is used. Fluctuations of the polymerization conditions can also influence the activity of the catalyst components used in different ways, so that different proportions of the polymer components formed by the individual catalyst components can also result. There is therefore a great need, in particular in the case of hybrid catalysts, for ways of controlling the composition of the polymers formed.

Multistage polymerization processes are normally carried out in at least two steps, which may be carried out in the same reactor or in at least two reactors operating in series; each step is conducted under different process conditions, in order to obtain polyethylene fractions having different molecular weights and/or different monomer compositions. The commonest way to obtain fractions of different molecular weight is to use different hydrogen concentrations in the reactors, while fractions of different compositions may be obtained by using different comonomer concentrations.

Such multimodal polyethylene blends are often produced using reactor cascades, i.e. two or more polymerization reactors connected in series, wherein the polymerization of the low molecular weight component occurs in the first reactor and the polymerization of the high molecular weight component occurs in the next reactor (see, for example, M. Rätzsch, W. Neiβl "Bimodale Polymerwerkstoffe auf der Basis von PP and PE" in "Aufbereiten von Polymeren mit neuartigen Eigenschaften" pp. 3-25, VDI-Verlag, Düsseldorf 1995).

A disadvantage of this process is that relatively large amounts of hydrogen have to be added to produce the fraction having the relatively lower molecular weight, and as a consequence, especially the low molecular weight polyethylene fraction has a very low content of vinyl groups, generally lower than 0.3. Moreover, when different hydrogen concentrations are used in the different reactors, it is technically difficult to prevent the hydrogen or any other molecular weight regulator added in the first reactor from getting into the second reactor.

The same problem is encountered when different comonomers, or different concentrations of comonomers are used in the various polymerization steps; in this case, a high outlay in terms of apparatus is necessary.

Various approaches have been tried in order to solve this problem. Thus, WO 00/50466 and WO 02/24768 describe polymerization processes using hybrid catalysts, in each of which two different hybrid catalysts are introduced into a reactor, with the two hybrid catalysts comprising the same catalyst components but in a different ratio. The ratio of the polymer components formed to one another can then be controlled by regulating the ratio of the two hybrid catalysts. However, to achieve this it is necessary to install two different metering systems on one reactor and regulate these relative to one another and also to produce and keep available two different catalyst solids for each polymer type produced.

It is therefore an object of the present invention to provide a multistage process able to overcome the above-mentioned problems.

SUMMARY OF THE INVENTION

It has surprisingly been found that this object can be achieved by a multistage polymerization process carried out in the presence of a specific catalyst system, by varying the amount of activating compound. In fact, the Applicant has unexpectedly found that the activity of specific families of ethylene polymerization catalysts may be selectively controlled by varying the amount of activating compound, thus allowing to control the molecular weight and the comonomer composition of the obtained polyethylene fractions.

Therefore, an object of the present invention is a multistage process for the homo or copolymerization of ethylene, comprising polymerizing ethylene and optionally one or more higher alpha-olefins in at least two polymerization steps, in the presence of a catalyst system comprising at least one polymerization catalyst (A) based on a late transition metal component having a tridentate ligand which bears at least two ortho,ortho-disubstituted aryl radicals, at least one Ziegler polymerization catalyst (B), and at least a Lewis acid activating compound (C), wherein the molar ratio of the metal of the activating compound (C) to the late transition metal of catalyst (A) is different in the two polymerizations steps.

The molar ratio of the metal of the Ziegler catalyst (B) to the late transition metal of the catalyst (A) is preferably in the range from 500:1 to 1:100, more preferably from 100:1 to 1:50, and even more preferably from 50:1 to 1:1.

According to a preferred embodiment, the process of the invention comprises:

a first polymerization step wherein the molar ratio of the metal in the activating compound (C) to the late transition metal of catalyst (A) ranges from 1,500:1 to 1:1, more preferably from 1,000:1 to 100:1, and even more preferably from 900:1 to 300:1;

a second polymerization step wherein the molar ratio of the metal in the activating compound (C) to the late transition metal of catalysts (A) ranges from 20,000:1 to 1,500:1, preferably from 10,000:1 to 2,000:1, and more preferably from 9,000:1 to 3,000:1.

Generally, the first polymerization step is carried out in the presence of low amounts of activating compound (C), which activate the catalyst (A) in order to obtain a first ethylene homo or copolymer fraction, while the second polymerization step is carried out in the presence of a higher amount of activating compound (C), which reduces the activity of the late transition metal catalyst (A), while activating the Ziegler catalyst (B) in order to obtain a second ethylene homo or copolymer fraction.

The two polymerization steps may be carried out in the same reactor or in at least two reactors operating in series.

The process of the invention is able to provide polyethylenes having density ranging from 0.900 to 0.970 g/cm³, $M_w$ of 100,000-900,000 g/mol, $M_w/M_n$ of at least 12, preferably of at least 15, and more preferably 20-50.

According to a preferred embodiment, the process of the invention provides multimodal polyethylenes comprising:

5 to 95% wt. of at least an ethylene homopolymer or a copolymer of ethylene with up to 2% mol. of a higher alpha-olefin, having density of 0.950-0.975 g/cm³, $M_w$ of 10,000-100,000 g/mol and $M_w/M_n$ comprised between 3 and 15, and 5 to 95% wt. of at least an ethylene homopolymer or a copolymer of ethylene with up to 15% mol, having density of 0.870-0.955 g/cm³, $M_w$ of 100,000-2,000,000 g/mol and $M_w/M_n$ comprised between 8 and 80.

DETAILED DESCRIPTION OF THE INVENTION

Unless otherwise indicated, by "polymer" is meant homopolymer or copolymer, comprising two or more comonomers.

Unless otherwise indicated, by "polymerization" is meant homopolymerization or copolymerization.

Unless otherwise indicated, by "polyethylene" is meant an ethylene homopolymer or a copolymer of ethylene and at least a further comonomer.

By "multimodal polyethyelene" is meant a polyethylene having at least a bimodal molecular weight distribution curve, having at least two molecular weight peaks, or at least a point of inflection on one flank of a maximum, due to the presence of at least two polymer fractions having different molecular weights. The multimodal polyethylene may also show three or more molecular weight peaks (or at least two points of inflection on one flank of a maximum), due to the presence of at least three polymer fractions having different molecular weights.

By "ethylene homopolymer" is meant a polymer comprising repeating ethylene monomeric units, possible comonomers of different species being present in a limited amount, in any case such that the melting temperature $T_m$ of the polymer is about 125° C. or greater, wherein the melting temperature $T_m$ is the temperature at the maximum of the melting peak as better described in the following. $T_m$ is measured according to ISO 11357-3 by a first heating at a heating rate of 20° C./min until a temperature of 200° C. is reached, a dynamic crystallization at a cooling rate of 20° C./min until a temperature of −10° C. is reached, ad a second heating at a heating rate of 20° C./min until a temperature of 200° C. is reached. The melting temperature $T_m$ (maximum of the melting peak of the second heating) is therefore the temperature at which the curve of the enthalpy vs. temperature of the second heating has a maximum.

By "copolymer of ethylene" is meant a polymer comprising repeating ethylene monomeric units and at least one further comonomer of different species, having a melting temperature $T_m$ lower than 125° C.

Unless otherwise indicated, by "molecular weight", unless otherwise indicated, is meant the weight average molar weight $M_w$, measured as indicated below.

All percentages of single components mentioned in the present application, unless otherwise indicated, are based on weight, based on the total weight of the corresponding composition or mixtures comprising those components.

Suitable late transition metal catalyst (A) are complexes of formula (I):

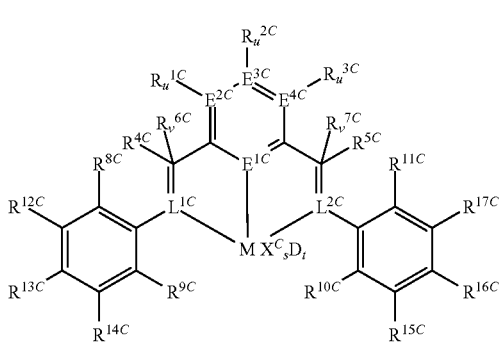

wherein:

M is Fe or Co, and preferably Fe,
$E^{1C}$ is nitrogen or phosphorus, preferably nitrogen,
$E^{2C}$-$E^{4C}$ are each, independently of one another, carbon, nitrogen or phosphorus, preferably carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or or seven-membered heterocycle comprising at least one atom selected from the group consisting of N, P, O and S,
$R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring and/or two geminal or vicinal radicals $R^{4C}$-$R^{7C}$ may be joined to form a five-, six- or seven-membered heterocycle comprising at least one atom selected from the group consisting of N, P, O and S and, when v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical or a halogen,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring and/or two vicinal radicals $R^{8C}$-$R^{17C}$ may be joined to form a five-, six- or seven-membered heterocycle comprising at least one atom selected from the group consisting of N, P, O and S, v is independently 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having from 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also be substituted by halogens or nitrogen- and oxygen-comprising groups and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also be substituted by halogens or nitrogen- and oxygen-comprising groups and two radicals $R^{19C}$ may also be joined to form a five- or six-membered ring,
s is 1, 2, 3 or 4, preferably 2 or 3,
D is an uncharged donor and
t is from 0 to 4, preferably 0, 1 or 2.

The three atoms $E^{2C}$ to $E^{4C}$ in a molecule can be identical or different. If $E^{1C}$ is phosphorus, then $E^{2C}$ to $E^{4C}$ are preferably carbon. If $E^{1C}$ is nitrogen, then $E^{2C}$ to $E^{4C}$ are preferably nitrogen or carbon, preferably carbon.

The substituents $R^{1C}$-$R^{3C}$ and $R^{12C}$-$R^{17C}$ can be varied within a wide range. Possible organic substituents $R^{1C}$-$R^{3C}$ and $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{1C}$ to $R^{3C}$ and/or two vicinal radicals $R^{12C}$-$R^{17C}$ may optionally also be joined to form a 5-, 6- or 7-membered ring and/or two of the vicinal radicals $R^{1C}$-$R^{3C}$ and/or two of the vicinal radicals $R^{12C}$-$R^{17C}$ may be joined to form a five-, six- or seven-membered heterocycle comprising at least one atom selected from the group consisting of N, P, O and S and/or the organic radicals $R^{1C}$-$R^{3C}$ and/or $R^{12C}$-$R^{17C}$ may also be substituted by halogens such as fluorine, chlorine or bromine. Furthermore, $R^{1C}$-$R^{3C}$ and $R^{12C}$-$R^{17C}$ can be amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy, or halogen such as fluorine, chlorine or bromine. In organosilicon substituents $SiR^{19C}_3$, possible radicals $R^{19C}$ are the same carboorganic radicals which have been mentioned in detail above for $R^{1C}$-

$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, preferably trimethylsilyl groups.

Preferred radicals $R^{12C}$, $R^{14C}$, $R^{15C}$, $R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. $R^{12C}$, $R^{14C}$, $R^{15C}$ and $R^{17C}$ are preferably hydrogen.

Preferred radicals $R^{13C}$ and $R^{16C}$ are hydrogen, methyl and chlorine.

Preferred radicals $R^{8C}$ and $R^{10C}$ are halogen, in particular chlorine.

Preferred radicals $R^{9C}$ and $R^{11C}$ are methyl.

Preference is given to $R^{12C}$, $R^{14C}$, $R^{15C}$ and $R^{17C}$ being identical and $R^{13C}$ and $R^{16C}$ being identical. This also preferably applies to the preferred embodiments described above.

The substituents $R^{4C}$-$R^{7C}$ can also be varied within a wide range. Possible organic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{4C}$ to $R^{7C}$ may optionally also be joined to form a 5-, 6- or 7-membered ring and/or two geminal radicals $R^{4C}$-$R^{7C}$ may be joined to form a five-, six- or seven-membered heterocycle comprising at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino, $NR^{18C}_2$ or $N(SiR^{19C}_3)_2$, for example dimethylamino, N-pyrrolidinyl or picolinyl. In organosilicon substituents $SiR^{19C}_3$, possible radicals $R^{19C}$ are the same carboorganic radicals which have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be joined via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or ortho-dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, preferably nitrogen, and when v is 0 can form a double bond to the carbon atom bearing $R^{4C}$ or $R^{5C}$. When v is 0, $L^{1C}$ and/or $L^{2C}$ together with the carbon atom bearing $R^{4C}$ or $R^{5C}$ preferably form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ preferably forms an amido group —$CR^{4C}R^{6C}$—$N^-$— or —$CR^{5C}R^{7C}$—$N^-$—.

The ligands $X^C$ are determined, for example, by the choice of the corresponding metal starting compounds which are used for the synthesis of the late transition metal complexes, but can also be varied subsequently. Preferred ligands $X^C$ are the halogens such as fluorine, chlorine, bromine or iodine and preferably chlorine. Alkyl radicals such as methyl, ethyl, propyl, butyl, vinyl, allyl, phenyl or benzyl can also be used as ligands $X^C$. Further ligands $X^C$ are, merely by way of example and not exhaustively, trifluoroacetate, $BF_4^-$, $PF_6^-$ and weakly coordinating or noncoordinating anions (see, for example, S. Strauss in Chem. Rev. 1993, 93, 927-942) such as $B(C_6F_5)_4^-$. Amides, alkoxides, sulfonates, carboxylates and β-diketonates are also particularly suitable ligands $X^C$. Some of these substituted ligands X are particularly preferably used since they can be obtained from cheap and readily available starting materials. Thus, a particularly preferred embodiment is obtained when $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible organic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups and/or N- or O-comprising radicals as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may bear further alkyl groups as substituents, e.g. benzyl, o-, m-, p-methylbenzyl, 1- or 2-ethylphenyl, where two radicals $R^{18C}$ may optionally also be joined to form a 5- or 6-membered ring and the organic $R^{18C}$ may also be substituted by halogens such as fluorine, chlorine or bromine. In organosilicon substituents $SiR^{19C}_3$, possible radicals $R^{19C}$ are the same radicals which have been mentioned above for $R^{18C}$, where two radicals $R^{19C}$ may optionally also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl, allyl, benzyl and phenyl as radicals $R^{18C}$.

The number s of the ligands $X^C$ depends on the oxidation state of the late transition metal. The number s can thus not be given in general terms. The oxidation state of the late transition metal complex in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to iron complexes in the oxidation state +3 or +2.

D is an uncharged donor, preferably an uncharged Lewis base or Lewis acid, for example an amine, alcohol, ether, ketone, aldehyde, ester, sulfide or phosphine, which can be bound to the late transition metal centre or else be comprised as residual solvent from the preparation of the late transition metal complexes.

The number t of the ligands D can be from 0 to 4 and is often dependent on the solvents in which the late transition metal complex is prepared and the time for which the resulting complexes are dried and can therefore also be a nonintegral number such as 0.5 or 1.5. t is preferably 0, 1 to 2.

Preferred embodiments are iron complexes of formula (IIa):

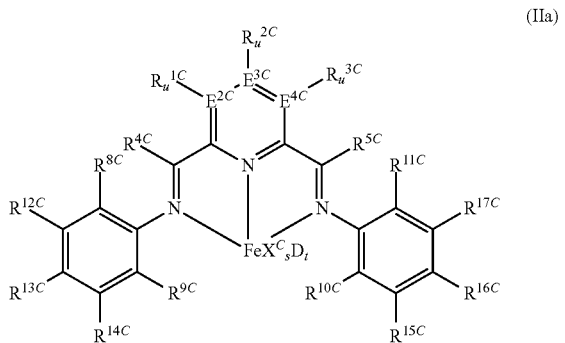

wherein:
$E^{2C}$-$E^{4C}$ are each, independently of one another, carbon, nitrogen or phosphorus, preferably carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom selected from the group consisting of N, P, O and S,
$R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{5C}$ may also be substituted by halogens,
u is 0 when $E^{2C}$-$E^{4C}$ is nitrogen or phosphorus and is 1 when $E^{2C}$-$E^{4C}$ is carbon,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, i.e. F, Cl, Br, I,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{12C}$-$R^{17C}$ may also be joined to form a five-, six-, or seven-membered ring and/or two vicinal radicals $R^{8C}$-$R^{17C}$ may be joined to form a five-, six- or seven-membered heterocycle comprising at least one atom selected from the group consisting of N, P, O and S,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also bear halogens or nitrogen- and oxygen-comprising groups as substituents and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also bear halogens or nitrogen- and oxygen-comprising groups as substituents and two radicals $R^{19C}$ may also be joined to form a five- or six-membered ring,
s is 1, 2, 3 or 4, preferably 2 or 3,
D is an uncharged donor and
t is from 0 to 4, preferably 0, 1 or 2.

The embodiments described above and the preferred embodiments likewise apply to $E^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible organic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where the organic radicals $R^{4C}$-$R^{5C}$ may optionally also be substituted by halogens such as fluorine, chlorine or bromine. Furthermore, $R^{4C}$-$R^{5C}$ can be amino $NR^{18C}{}_2$ or $N(SiR^{19C}{}_3)_2$, for example dimethylamino, N-pyrrolidinyl or picolinyl. In organosilicon substituents $SiR^{19C}{}_3$, possible radicals $R^{19C}$ are the same organic radicals as have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, preferably methyl.

The substituents $R^{12C}$-$R^{17C}$ can be varied within a wide range. Possible organic substituents $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{12C}$ to $R^{17C}$ may optionally also be joined to form a 5-, 6- or 7-membered ring and/or two vicinal radicals $R^{12C}$-$R^{17C}$ may be joined to form a five-, six- or seven-membered heterocycle comprising at least one atom from the group consisting of N, P, O and S and/or the organic radicals $R^{12C}$-$R^{17C}$ may also be substituted by halogens such as fluorine, chlorine or bromine. Furthermore, $R^{12}$-$R^{17C}$ can be halogen such as fluorine, chlorine, bromine, amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy. In organosilicon substituents $SiR^{19C}{}_3$, possible radicals $R^{19C}$ are the same carboorganic radicals as mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals may also be bound via oxygen or nitrogen, for example trimethylsilyloxy, triethylsilyloxy, butyldimethylsilyloxy, tributylsilyloxy or tri-tert-butylsilyloxy.

Preferred radicals $R^{12C}$, $R^{14C}$, $R^{15C}$, $R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. The Radicals $R^{12C}$, $R^{14C}$, $R^{15C}$ and $R^{17C}$ are preferably hydrogen.

Preferred radicals $R^{13C}$ and $R^{16C}$ are hydrogen, methyl and chlorine.

Preferred radicals $R^{8C}$ and $R^{10C}$ are halogen, in particular chlorine.

Preferred radicals $R^{9C}$ and $R^{11C}$ are methyl.

Preference is given to $R^{12C}$, $R^{14C}$, $R^{15C}$ and $R^{17C}$ being identical and $R^{13C}$ and $R^{16C}$ being identical. This preferably also applies to the preferred embodiments described above.

The preparation of the compounds (A) is described, for example, in J. Am. Chem. Soc. 120, p. 4049 ff. (1998), J. Chem. Soc., Chem. Commun. 1998, 849 and WO 98/27124. Preferred complexes (A) are 2,6-diacetylpyridinebis(2,6-dimethylphenylimine)iron dichloride, 2,6-diacetylpyridinebis(2,4,6-trimethylphenylimine)iron dichloride, 2,6-diacetylpyridinebis(2-chloro-6-methylphenylimine)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis(2,6-dibromophenylimine) iron dichloride or the respective dibromides or tribromides.

Another class of suitable late transition metal catalyst (A) are complexes of formula (IIb):

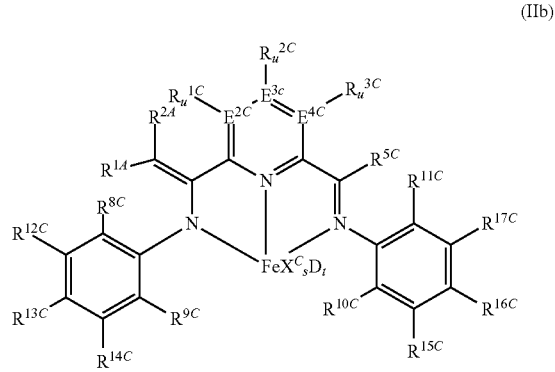

(IIb)

wherein:

$R^{1A}$-$R^{2A}$ independently of one another are hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}{}_3$, wherein the organic radicals $R^{1A}$-$R^{2A}$ can also be substituted by halogens, and/or two radicals $R^{1A}$-$R^{2A}$ can also be bonded with one another to form a five- or six-membered ring, and the other variables have the meaning reported above for formula (IIa).

Another class of suitable late transition metal catalyst (A) are complexes of formula (IIc):

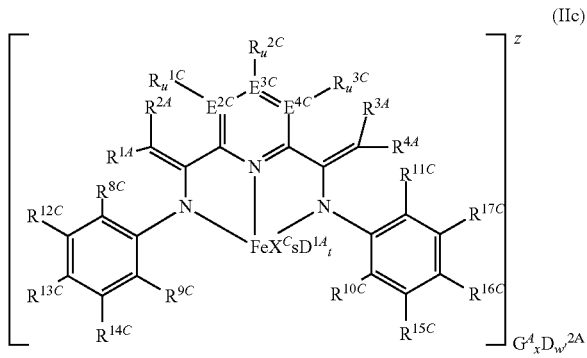

wherein:
$R^{3A}$-$R^{4A}$ independently of one another are hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^{3A}$-$R^{4A}$ can also be substituted by halogens, and/or in each case two radicals $R^{3A}$-$R^{4A}$ can also be bonded with one another to form a five- or six-membered ring,
$G^A$ is a simply positively charged cation,
$D^{1A}$, $D^{2A}$ are a neutral donor,
w are 0 to 4,
x is 0, 1 or 2,
z is 0, −1 or −2,
and the other variables have the meaning reported above for formulae (IIa) and (IIb).

The late transition metal catalyst (A) may be suitably activated by a cocatalyst, and preferably by one or more aluminoxanes. As aluminoxanes, it is possible to use, for example, the compounds described in WO 00/31090. Particularly suitable aluminoxanes are open-chain or cyclic aluminoxane compounds of the general formula (IV) or (V)

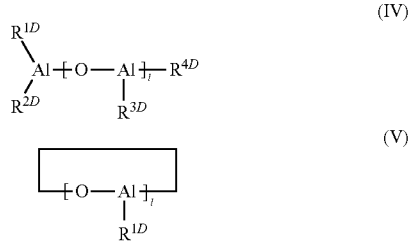

Where $R^{1D}$-$R^{4D}$ are each, independently of one another, a $C_1$-$C_6$-alkyl group, preferably a methyl, ethyl, butyl or isobutyl group, and I is an integer from 1 to 40, preferably from 4 to 25.

A particularly suitable aluminoxane compound is methylaluminoxane.

These oligomeric aluminoxane compounds are usually prepared by controlled reaction of a solution of trialkylaluminum, preferably trimethylaluminum, with water. In general, the oligomeric aluminoxane compounds obtained in this way are present as mixtures of both linear and cyclic chain molecules of various lengths, so that I is to be regarded as an average. The aluminoxane compounds can also be present in admixture with other metal alkyls, usually with aluminum alkyls.

Furthermore, modified aluminoxanes in which some of the hydrocarbon radicals have been replaced by hydrogen atoms or alkoxy, aryloxy, siloxy or amide radicals can also be used in place of the aluminoxane compounds of the general formula (IV) or (V).

A further type of suitable cocatalyst for the late transition metal catalyst (A) is hydroxyaluminoxanes. These can be prepared, for example, by addition of from 0.5 to 1.2 equivalents of water, preferably from 0.8 to 1.2 equivalents of water, per equivalent of aluminum of an alkylaluminum compound, particularly preferably triisobutylaluminum, at low temperatures, usually below 0° C. Such compounds and their use in olefin polymerization are described, for example, in WO 00/24787. The atomic ratio of aluminum from the hydroxyaluminoxane compound to the late transition metal of catalyst (A) is usually in the range from 1:1 to 100:1, preferably from 10:1 to 50:1 and particularly preferably in the range from 20:1 to 40:1.

Ziegler catalysts (B) are well known in the art and are described for example in ZIEGLER CATALYSTS 363-386 (G. Fink, R. Mülhaupt and H. H. Brintzinger, eds., Springer-Verlag 1995). For the purposes of the present application, the expression Ziegler catalyst also includes the catalysts referred to as Ziegler-Natta catalysts in the literature.

The Ziegler catalyst (B) preferably comprises a solid component comprising a compound of titanium or vanadium, a compound of magnesium and optionally but preferably a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $TI(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides, and in particular chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine, and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable halogen-free compounds of magnesium are diethylmagnesium, di-n-propylmagnesium, diisopropylmagnesium, di-n-butylmagnesium, d i-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds.

Particular preference is given to using Ziegler catalysts which are commercially available, e.g. from Grace.

Activating compounds (C) are Lewis acids, able to react with late transition metal catalyst (A) and with the Ziegler catalyst (B) to convert them into catalytically active or more active compounds.

The Lewis acids are preferably strong Lewis acid compounds of the general formula (III)

$$M^{2D}X^{1D}X^{2D}X^{3D} \quad (III)$$

wherein
$M^{2D}$ is an element of group 13 of the Periodic Table of the Elements, preferably B, Al or Ga, and more preferably B, $X^{1D}$, $X^{2D}$ and $X^{3D}$ are each, independently of one another, hydrogen, $C_1$-$C_{10}$-alkyl, $C_6$-$C_{15}$-aryl, alkylaryl, arylalkyl, haloalkyl or haloaryl having from 1 to 10 carbon atoms in the alkyl radical and from 6 to 20 carbon atoms in the aryl radical, or fluorine, chlorine, bromine or iodine, preferably a haloaryl, and more preferably pentafluorophenyl.

Further examples of strong Lewis acids are mentioned in WO 00/31090.

Suitable aluminum activating compounds (C) are trialkylaluminum and compounds derived therefrom, in which an alkyl group has been replaced by an alkoxy group or by a halogen atom, for example by chlorine or bromine. The alkyl groups can be identical or different. Both linear and branched alkyl groups are possible.

Preference is given to trialkylaluminum compounds wherein the alkyl groups have from 1 to 8 carbon atoms, such as trimethylaluminum, triethylaluminum, triisobutylaluminum, trioctylaluminum, methyldiethylaluminum and mixtures thereof. According to a preferred embodiment, the activating compound (C) is selected from the group consisting of trimethylaluminum (TMA), triethylaluminum (TEA), triisobutylaluminum (TIBA) and mixtures thereof.

Suitable activating compounds (C) also include boranes and boroxins, e.g. trialkylborane, triarylborane or trimethylboroxin. Particular preference is given to boranes bearing at least two perfluorinated aryl radicals. Particular preference is given to compounds of formula (III) wherein $X^{1D}$, $X^{2D}$ and $X^{3D}$ are identical, such as triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5 trifluorophenyl)borane. Tris(pentafluorophenyl)borane is preferably used.

The compounds (C) may be prepared by reaction of aluminum or boron compounds of the formula (III) with water, alcohols, phenol derivatives, thiophenol derivatives or aniline derivatives, with the halogenated and especially the perfluorinated alcohols and phenols being of particular importance. Examples of particularly suitable compounds are pentafluorophenol, 1,1-bis(pentafluorophenyl)methanol and 4-hydroxy-2,2',3,3',4,4',5,5',6,6'-nonafluorobiphenyl. Examples of combinations of compounds of the formula (III) with Brönsted acids are first and foremost trimethylaluminum/pentafluorophenol, trimethylaluminum/1-bis(pentafluorophenyl)methanol, trimethylaluminum/4-hydroxy-2,2',3,3', 4,4',5,5',6,6'-nonafluorobiphenyl, triethylaluminum/pentafluorophenol, triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (III), $R^{1D}$ is an OH group, as in, for example, boronic acids and borinic acids, with preference being given to borinic acids having perfluorinated aryl radicals, for example $(C_6F_5)_2$BOH.

Strong Lewis acids which are suitable as activating compounds (C) also include the reaction products of a boric acid with two equivalents of an aluminum trialkyl or the reaction products of an aluminum trialkyl with two equivalents of an acidic fluorinated, preferably perfluorinated hydrocarbon compounds, such as pentafluorophenol or bis(pentafluorophenyl)borinic acid.

The molar ratio of the metal (preferably Al) in activating compound (C) to the late transition metal (preferably Fe) of catalyst (A) preferably ranges from 20,000:1 to 1:1 and is different in the at least two polymerizations steps of the multistage process of the invention.

According to a preferred embodiment:
in a first polymerization step, the molar ratio of the metal in the activating compound (C) to the late transition metal of catalyst (A) ranges from 1,500:1 to 1:1, preferably from 1,000:1 to 100:1, and even more preferably from 900:1 to 300:1;
in a second polymerization step, the molar ratio of the metal in the activating compound (C) to the late transition metal of catalysts (A) ranges from 20,000:1 to 1,500:1, preferably from 10,000:1 to 2,000:1, and more preferably from 9,000:1 to 3,000:1.

The molar ratio of the metal of the Ziegler catalyst (B) to the late transition metal of catalyst (A) to is preferably in the range from 500:1 to 1:100, more preferably from 100:1 to 1:50, and even more preferably from 50:1 to 1:1.

Both the late transition metal complex (A) and the Ziegler catalyst (B) and also the activating compounds (C) are preferably used in a solvent, with preference being given to aromatic hydrocarbons having from 6 to 20 carbon atoms, in particular xylenes, toluene, pentane, hexane, heptane or mixtures of these.

The catalyst components (A), (B) and (C) can be used either alone or together with further components, as catalyst system for olefin polymerization. Further optional components may be one or more organic or inorganic supports (D).

In particular, to enable the late transition metal complex (A) and the Ziegler component (B) to be used in the gas phase or in suspension in polymerization processes, it is often advantageous for the complexes to be used in the form of a solid, i.e. for them to be applied to a solid support (D). Furthermore, the supported complexes have a high productivity. The late transition metal catalyst (A) and/or the Ziegler catalysts (B) can therefore optionally be immobilized on an organic or inorganic support (D) and be used in supported form in the polymerization. This enables, for example, deposits in the reactor to be avoided and the polymer morphology to be controlled.

As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers having polar functional groups, for example copolymers of ethene and acrylic esters, acrolein or vinyl acetate.

A preferred catalyst composition to be used in the process of the invention comprises one or more support components. It is possible for both the late transition metal catalyst (A) and the Ziegler catalyst (B) to be supported, or only one of the two components can be supported. In a preferred variant, both components (A) and (B) are supported. The two components (A) and (B) can have been applied to different supports or together to a joint support. The components (A) and (B) are preferably applied to a joint support in order to ensure relative spatial proximity of the various catalyst sites and thus achieve good mixing of the different polymers formed.

To produce the catalyst systems of the invention, one of the components (A) and one of the components (B) and/or activator (C) are preferably immobilized on the support (D) by physisorption or by means of a chemical reaction, i.e. covalent bonding of the components, with reactive groups of the support surface.

The order in which support component (D), late transition metal complex (A), Ziegler catalyst (B) and the activating compound (C) are combined is in principle immaterial. After the individual process steps, the various intermediates can be washed with suitable inert solvents, e.g. aliphatic or aromatic hydrocarbons.

The late transition metal complex (A), the Ziegler catalyst (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the Ziegler catalyst (B) and/or the late transition metal complex (A). Preactivation of the Ziegler catalyst (B) with one or more activating compounds (C) before mixing with the support (D) is also possible. The late transition metal component can, for example, be reacted simultaneously with the transition metal complex with the activating compound (C) or can be preactivated separately by means of this. The preactivated late transition metal complex (A) can be applied to the support before or after the preactivated Ziegler catalyst (B). In one possible embodiment, the late transition metal complex (A) and/or the Ziegler catalyst (B) can also be prepared in the presence of the support material. A further method of immobilization is prepolymerization of the catalyst system with or without prior application to a support.

The immobilization is generally carried out in an inert solvent which can be filtered off or evaporated after the immobilization. After the individual process steps, the solid can be washed with suitable inert solvents, e.g. aliphatic or aromatic hydrocarbons, and dried. The use of the still moist, supported catalyst is also possible.

In a preferred form of the preparation of the supported catalyst system, at least one late transition metal complex (A) is brought into contact with an activating compound (C) and subsequently mixed with the dehydrated or passivated support material (D). The Ziegler catalyst (B) is likewise brought into contact with at least one activating compound (C) in a suitable solvent, preferably giving a soluble reaction product, an adduct or a mixture. The preparation obtained in this way is then mixed with the immobilized late transition metal complex, which is used either directly or after separating off the solvent, and the solvent is completely or partly removed. The resulting supported catalyst system is preferably dried to ensure that the solvent is removed completely or largely from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly applying the activating compound (C) to the support component (D) and subsequently bringing this supported compound into contact with the late transition metal complex (A) and the Ziegler catalyst (B).

As support component (D), preference is given to using finely divided supports which can be any organic or inorganic solid. In particular, the support component (D) can be a porous support such as talc, a sheet silicate such as montmorillonite or mica, an inorganic oxide or a finely divided polymer powder (e.g. polyolefin or polymer having polar functional groups).

The support materials used preferably have a specific surface area in the range from 10 to 1000 m$^2$/g, a pore volume in the range from 0.1 to 5 ml/g and a mean particle size of from 1 to 500 μm. Preference is given to supports having a specific surface area in the range from 50 to 700 m$^2$/g, a pore volume in the range from 0.4 to 3.5 ml/g and a mean particle size in the range from 5 to 350 μm. Particular preference is given to supports having a specific surface area in the range from 200 to 550 m$^2$/g, a pore volume in the range from 0.5 to 3.0 ml/g and a mean particle size of from 10 to 150 μm.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to obtain, if appropriate, the desired structure of the solid and/or the desired OH concentration on the surface. The support can also be treated chemically using customary dessicants such as metal alkyls, preferably aluminum alkyls, chlorosilanes or $SiCl_4$ or else methylaluminoxane. Appropriate treatment methods are described, for example, in WO 00/31090.

The inorganic support material can also be chemically modified. For example, the treatment of silica gel with $NH_4SiF_6$ or other fluorinating agents leads to fluorination of the silica gel surface or the treatment of silica gels with silanes comprising nitrogen-, fluorine- or sulfur-comprising groups leads to correspondingly modified silica gel surfaces. The support material is preferably not an adduct of the formula $MgT_2 \cdot y\, AlR^v_j(OR^w)_{3-j}$, where Mg is magnesium, T is chlorine, bromine or iodine, Al is aluminum, $R^w$ is a linear or branched $C_1$-$C_{10}$-alkyl radical, y is in the range from 6.00 to 0.05, j is in the range from 3 to 0.1 and $R^v$ represents substituents which are identical or different and are hydrocarbon radicals having from 1 to 20 carbon atoms, e.g. linear or branched, cyclic or acyclic $C_1$-$C_{20}$-alkyls, $C_2$-$C_{20}$-alkenyls, $C_2$-$C_{20}$-alkynyls, $C_6$-$C_{20}$-aryls, $C_7$-$C_{20}$-alkylaryls or $C_7$-$C_{20}$-arylalkyl radicals, which may comprise silicon or germanium atoms.

Organic support materials such as finely divided polyolefin powders (e.g. polyethylene, polypropylene or polystyrene) can also be used and should preferably likewise be freed of adhering moisture, solvent residues or other impurities by means of appropriate purification and drying operations before use. It is also possible to use functionalized polymer supports, e.g. ones based on polystyrene, polyethylene, polypropylene or polybutylene, via whose functional groups, for example ammonium or hydroxyl groups, at least one of the catalyst components can be immobilized. Polymer blends can also be used.

Inorganic oxides suitable as support component (D) may be found in groups 2, 3, 4, 5, 13, 14, 15 and 16 of the Periodic Table of the Elements. Examples of oxides preferred as supports comprise silicon dioxide, aluminum oxide and mixed oxides of the elements calcium, aluminum, silicon, magnesium or titanium and also corresponding oxide mixtures. Other inorganic oxides which can be used either alone or in combination with the abovementioned preferred oxidic supports are, for example, MgO, CaO, $AlPO_4$, $ZrO_2$, $TiO_2$, $B_2O_3$ or mixtures thereof.

Further preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

Preference is given to using silica gels as solid support materials (D) for catalysts for olefin polymerization since this material makes it possible to produce particles whose size and structure make them suitable as supports for olefin polymerization. Spray-dried silica gels, which are spherical agglomerates of smaller granular particles, viz. the primary particles, have been found to be particularly useful here. The silica gels can be dried and/or calcined before use.

The silica gels used are generally used as finely divided powders having a mean particle diameter D50 of from 5 to 200 µm, preferably from 10 to 150 µm, particularly preferably from 15 to 100 µm and more preferably from 20 to 70 µm, and usually have pore volumes of from 0.1 to 10 $cm^3$/g, preferably from 0.2 to 5 $cm^3$/g, and specific surface areas of from 30 to 1000 $m^2$/g, preferably from 50 to 800 $m^2$/g and preferably from 100 to 600 $m^2$/g. The Ziegler catalyst (A) is preferably applied in such an amount that the concentration of the transition metal from the Ziegler catalyst (A) in the finished catalyst system is from 1 to 100 µmol, preferably from 5 to 80 µmol and particularly preferably from 10 to 60 µmol, per g of support (D).

The late transition metal catalyst (A) is preferably applied in such an amount that the concentration of the late transition metal from the late transition metal catalyst (A) in the finished catalyst system is from 1 to 200 µmol, preferably from 5 to 100 µmol and particularly preferably from 10 to 70 µmol, per g of support (D). The Ziegler catalyst (B) is preferably applied in such an amount that the concentration of transition metal from the Ziegler catalyst (B) in the finished catalyst system is from 1 to 200 µmol, preferably from 5 to 100 µmol and particularly preferably from 10 to 70 µmol, per g of support (D).

It is also possible for the catalyst system firstly to be prepolymerized with alpha-olefins, preferably linear $C_2$-$C_{10}$-1-alkenes and more preferably ethylene or propylene, and the resulting prepolymerized catalyst solid then to be used in the actual polymerization. The weight ratio of catalyst solid used in the prepolymerization to a monomer polymerized onto it is preferably in the range from 1:0.1 to 1:1000, preferably from 1:1 to 1:200. Furthermore, a small amount of an olefin, preferably an alpha-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of late transition metal catalyst (A) and Ziegler catalyst (B) is usually from 1:1000 to 1000:1, preferably from 1:5 to 20:1.

The polymerization steps of the multistage process of the invention can be carried out using any industrially known polymerization method.

According to a preferred embodiment of the process of the invention:
in the first polymerization step, catalyst (A) produces more than 20% wt., preferably more than 30% of the polymer produced in this step; and
in the second polymerization step, the Ziegler catalyst (B) produces more than 20% wt., preferably more than 30% of the polymer produced in this step.

According to another embodiment of the process of the invention:
in the first polymerization step, the Ziegler catalyst (B) produces more than 20% wt., preferably more than 30% of the polymer produced in this step; and
in the second polymerization step, catalyst (A) produces more than 20% wt., preferably more than 30% of the polymer produced in this step.

The polymerization temperature is preferably in the range from −60 to 350° C., more preferably in the range from 20 to 300° C., and even more preferably from 25 to 150° C.

The polymerization pressure preferably is in the range of from 0.5 to 4000 bar, more preferably from 1 to 100 bar and, and even more preferably from 3 to 40 bar.

The polymerization steps can be carried out in batch or in continuous.

The polymerization steps can be carried out in bulk, in suspension, in the gas phase or in a supercritical medium, in conventional reactors for the polymerization of olefins.

High-pressure polymerization processes in tube reactors or autoclaves, solution processes, suspension processes, stirred gas-phase processes and gas-phase fluidized-bed processes can be conveniently used.

The mean residence times are preferably from 0.5 to 5 hours, more preferably from 0.5 to 3 hours. As known in the art, the suitable pressure and temperature values for carrying out the polymerization steps of the process of the invention will depend on the polymerization method.

In the case of high-pressure polymerization processes, which are preferably carried out at pressures of from 1000 to 4000 bar, in particular from 2000 to 3500 bar, high polymerization temperatures are preferably also set. Preferred temperature ranges for these high-pressure polymerization processes are from 200 to 320° C., more preferably from 220 to 290° C.

In the case of low-pressure polymerization processes, it is preferred to set a temperature which is at least a few degrees below the softening temperature of the polymer. In particular, temperatures of from 50 to 180° C., preferably from 70 to 120° C., are preferably set in these polymerization processes.

In the case of suspension polymerizations, the polymerization is preferably carried out in a suspension medium, preferably an inert hydrocarbon such as isobutane or mixtures of hydrocarbons or else in the monomers themselves. The polymerization temperature is preferably in the range from −20 to 115° C., and the pressure is preferably in the range from 1 to 100 bar. The solids content of the suspension is generally in the range from 10 to 80% wt.

Gas-phase polymerization steps are preferably carried out in the temperature range from 30 to 125° C., and preferably at a pressure of from 1 to 50 bar.

Among the above-mentioned alternative polymerization processes, particular preference is given to gas-phase polymerization, preferably carried out in gas-phase fluidized-bed reactors, to solution polymerization and to suspension polymerization, preferably in loop reactors and stirred tank reactors. The gas-phase polymerization can also be carried out in the condensed or supercondensed mode, in which part of the circulating gas is cooled to below the dew point and is recirculated as a two-phase mixture to the reactor.

According to a further alternative embodiment, it is possible to use a multizone reactor comprising two distinct polymerization zones connected to one another, by passing the polymer alternately through these two zones a predetermined number of times. The two zones preferably have different polymerization conditions, and in particular different concentrations of activating compound (C), so as to perform two different polymerization stages. Such a reactor is described, for example, in WO 97/04015. The polymerization stages can also, if desired, be connected in series so as to form a polymerization cascade in two reactors arranged in series. Furthermore, molar weight regulators, for example hydrogen, or customary additives such as antistatics can also be used in the polymerizations.

The process of the present invention allows the obtainment of polyethylenes having preferably a density ranging from 0.900 to 0.970 g/cm$^3$, more preferably 0.930-0.970 g/cm$^3$.

The polyethylenes have preferably a $M_w$ of 100,000-900,000 g/mol, more preferably 150,000-750,000 g/mol.

The polyethylenes have preferably a polydispersity $M_w/M_n$, i.e. the ratio between the weight average molecular weight $M_w$ and the number average molecular weight $M_n$, of at least 12, preferably of at least 15, more preferably 20-50.

The polyethylenes may be multimodal, preferably bimodal, and comprise at least a first ethylene polymer fraction including an ethylene polymer, preferably homopolymer, having a first molecular weight, and at least a second ethylene polymer fraction including an ethylene copolymer having a second molecular weight, higher than said first molecular weight.

The ratio of the higher molecular weight fraction to the lower molecular weight fraction is preferably from 5 to 95% by weight, more preferably from 10 to 90% by weight, particularly preferably from 20 to 80% by weight, in each case based on the sum of the higher and lower molecular weight fractions.

One of the advantages of the process of the present invention is that it allows the obtainment of multimodal polyethelens with an inverse comonomer distribution, wherein the first ethylene polymer fraction, having a relatively lower molecular weight, has a minor amount of comonomer, if any, and the second ethylene polymer fraction, having a relatively higher molecular weight, includes a higher comonomer content. These multimodal polyethyenes show an advantageous balance of mechanical properties.

By "inverse comonomer distribution" is meant a comonomer distribution in which the comonomer is predominantly or only incorporated in the ethylene polymer fraction having the higher molecular weight.

According to a preferred embodiment, the multimodal polyethylene obtained with the process of the invention comprises:

at least an ethylene homopolymer or a copolymer of ethylene with up to 2% mol., preferably up to 0.8% mol. of a higher alpha-olefin, having a density of 0.950-0.975 g/cm$^3$, preferably of 0.960-0.970 g/cm$^3$, $M_w$ of 10,000-100,000 g/mol, preferably of 30,000-70,000 g/mol, and $M_w/M_n$ comprised between 3 and 15, preferably between 4 and 12, and at least an ethylene homopolymer or a copolymer of ethylene with up to 15% mol, preferably from 0. to 10% mol. of a higher alpha-olefin, having a density of 0.870-0.955 g/cm$^3$, preferably 0.920-0.965 g/cm$^3$, $M_w$ of 100,000-2,000,000 g/mol, preferably 200,000-800,000 g/mol, and $M_w/M_n$ comprised between 8 and 80, preferably 10-50.

Preferred higher alpha-olefins have from 3 to 12 carbon atoms, and more preferred are linear or branched $C_2$-$C_{12}$-1-alkenes, in particular linear $C_2$-$C_{10}$-1-alkenes such as propene, 1-butene, 1-pentene, 1-hexene, 1-heptene, 1-octene, 1-decene or branched $C_2$-$C_{10}$-1-alkenes such as 4-methyl-1-pentene.

The ethylene copolymer preferably comprises at least one higher alpha-olefin having from 4 to 8 carbon atoms, more preferably selected from the group consisting of 1-butene, 1-hexene and 1-octene.

According to a preferred embodiment of the invention, the multimodal polyethylenes produced with the process of the present invention have at least 1.5 $CH_3$ groups/1000 carbon atoms, more preferably from 1.5 to 15 $CH_3$ groups /1000 carbon atoms. The $CH_3$ groups/1000 carbon atoms are determined by means of $^{13}$C-NMR, as described by James. C. Randall, JMS-REV. Macromol. Chem. Phys., C29 (2 & 3), 201-317 (1989), and refer to the total content of $CH_3$ groups/1000 carbon atoms.

Preferably, the multimodal polyethylenes has at least 0.3 vinyl groups/1000 carbon atoms, more preferably from 0.5 to 3 vinyl groups/1000 carbon atoms. The content of vinyl groups/1000 carbon atoms refers to the content of —CH=$CH_2$ groups and is determined by means of IR, ASTM D 6248-98.

Preferably, the multimodal polyethylenes has at least 0.1 vinylidene groups/1000 carbon atoms, more preferably from 0.1 to 0.5 vinylidene groups/1000 carbon atoms. The content of vinylidene groups/1000 carbon atoms is determined by means of IR, ASTM D 6248-98.

Vinyl groups are usually attributed to a polymer termination reaction after an ethylene insertion, while vinylidene end groups are usually formed after a polymer termination reaction after a comonomer insertion.

The multimodal polyethylene obtained from the process of the invention may be advantageously used for producing fibers, films, moldings and pipes.

The polyethylenes produced with the process of the invention are in particular suitable for the production of blown film and cast films, since they posses good mechanical properties, high shock resistance and high tear strength combined with very good optical properties, in particular transparency and gloss.

Owing to their good mechanical properties, the polyethylenes are likewise suitable for producing fibers and moldings, in particular for pipes.

The following analytical methods have been used to determine the properties reported in the description and in the examples.

GPC Analysis

The determination of the molar mass distributions and the means Mn, Mw and Mw/Mn derived therefrom was carried out by high-temperature gel permeation chromatography using the method described in DIN 55672-1:1995-02 (February 1995), with the following deviations: solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000, equipped with the following pre-column SHODEX UT-G and separation columns SHODEX UT 806 M (3×) and SHODEX UT 807 connected in series, was used. The solvent was vacuum distilled under $N_2$ and was stabilized with 0.025% by weight of 2,6-di-tert-butyl-4-methylphenol. The flow rate used was 1 ml/min, the injection was 500 μl and polymer concentration was in the range of 0.01%-0.05% w/w. The molecular weight calibration was established by using monodisperse polystyrene (PS) standards from Polymer Laboratories (now Varian, Inc., Essex Road, Church Stretton, Shropshire, SY6 6AX, UK), in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used were for PS: $k_{ps}$=0.000121 dl/g, $\alpha_{ps}$=0.706 and for PE $k_{pe}$=0.000406 dl/g, $\alpha_{ps}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim) respectively.

IR Analysis

The density [g/cm$^3$] was determined with IR in accordance with ASTM D 6248-98.

The vinyl double bond content, i.e. the content of vinyl groups/1000 carbon atoms, was determined by means of IR in accordance with ASTM D 6248-98.

The trans double bond content, i.e. the content of trans bonds/1000 carbon atoms, was determined by means of IR, ASTM D 6248-98.

The comonomer content was determined by means of IR in accordance with ASTM D 6248-98.

The amount of Aluminum, Iron, Magnesium, and Titanium in the catalyst was measured by ICP-OES method, according to DIN EN ISO 11885.

The following examples illustrate the invention without restricting the scope thereof.

EXAMPLE 1

Preparation of 2,6-diacetylpyridinebis(2-chloro-6-methylphenvlanil)iron dichloride Synthesis of 2,6-diacetylpyridinebis(2-chloro-4,6-dimethylanil)

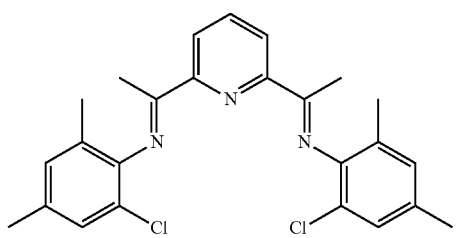

To a solution of 2,6-diacetylpyridine (35 g, 0.21 mol) in THF (1.2l) was added 2-chloro-4,6-dimethylaniline (76.7 g, 2.3 eq) and Sicapent (45 g). The reaction mixture was refluxed overnight. Then additional 2-chloro-4,6-dimethylaniline (25 g, 0.7 eq) and Sicapent (25 g) were added and once again refluxed overnight. The suspension was cooled to 22° C., filtered and washed with two times THF (75 ml). The mother liquor was concentrated (90%) and methanol was added to precipitate the product, which was washed two times with methanol (50 ml) and dried under high vacuum. 68.8 g of a yellow powder was isolated (y=73.1%)

Synthesis of 2,6-diacetylpyridinebis(2-chloro-4,6-dimethylanil)FeCl$_2$

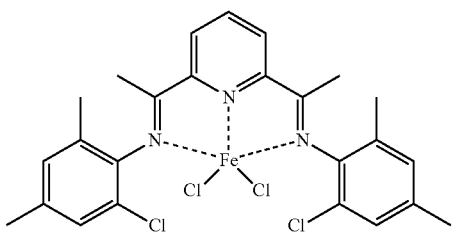

To a solution of 2,6-diacetylpyridinebis(2-chloro-4,6-dimethylanil) (150 g, 0.34 mol) in THF (3l) was added by portions FeCl$_2$.4H$_2$O (64.6 g, 0.95 eq) at 22° C. The reaction mixture turned blue. After stirring 3 hours at 22° C., the blue suspension was filtered, washed three times with THF (300 ml) and dried under high vacuum. 174.0 g of a blue powder was isolated (y=90%).

EXAMPLE 2

Preparation of the Ziegler Catalyst

A catalyst comprising TiCl$_4$ supported on MgCl$_2$(EtOH) adducts and AcOEt as electron donor was prepared as described in Example 14 of WO2004/106388.

EXAMPLE 3

Preparation of a Mixed Catalyst System

In a 250 ml double-neck round glass vessel, equipped with a vacuum Teflon stirrer, 15.3 g of the Ziegler catalyst prepared in Example 2 were suspended, under argon atmosphere, in 40 ml heptane and cooled to 0° C.

Separately, 297 mg of the iron catalyst prepared in Example 1 were added to 15.5 ml of a solution of MAO 30% wt in toluene, and stirred for 1 hour at room temperature. The obtained catalytic solution was cooled to 0° C. and added in 60 minutes to the Ziegler catalyst suspension, under stirring, maintaining the temperature at 0° C.±2° C. At the end of the addition, the suspension was maintained under stirring for 1 hour at room temperature. The color of the filter cake veered from ochre to brown and finally to black. The solvent was filtered off under vacuum and the filter cake was then suspended at room temperature in 30 ml heptane, stirred for 15 minutes and filtered off again; this procedure was repeated twice.

The catalyst was finally dried to a free flowing powder at room temperature with vacuum, in order to reach 5-10% wt residual volatiles.

18.27 g of dry catalyst were collected and analysed by ICP method and gave the following results:
Al=9.0% wt
Mg=11.4% wt
Ti=2.0% wt
Fe=0.16% wt The molar ratio of Ti of the Ziegler catalyst (B) to Fe of the iron catalyst (A) was 14.

EXAMPLE 4

Ethylene Polymerization 80 g polyethylene powder having a particle size higher than 1 mm (sieved fraction, dried for 24 hours at 80° C. and stored under argon), were loaded under vacuum to a 1 L steal autoclave, and then heated up to 70° for 30 minutes, under vacuum.

The reactor was pressurized at 1 bar-a with argon and 1 ml Costelan® AS 100-solution (obtained by providing 0.55 ml Costelan® AS 100, from Costenoble, and filling with heptane to 100 ml) was fed to the reactor and stirred for 10 minutes.

1 ml of a TIBA solution in toluene (0.771 mol/L TIBA) was fed to the reactor and stirred for 10 minutes.

56 mg of the mixed catalyst system prepared in Example 3 were injected as a free flowing powder. The reactor was heated to 70° C. and pressurized with 10 bar argon and 0.5 bar hydrogen until a 10.5 bar-g as total pressure. The molar ratio of Al of TIBA to iron of the mixed catalyst system was 480.

Ethylene was fed into the reactor until a pressure of 20.5 bar-g was reached; after 60 minutes of continuous ethylene feeding, maintaining the reactor pressure at 20.5 bar-g, the polymerization was stopped by flashing out the monomers up to 0.5 bar-g.

Without discharging the polymer, 10 mL of a TIBA solution in toluene (0.771 mol/L TIBA) were fed to the reactor and stirred for 10 minutes; the molar ratio of Al of TIBA to iron of the mixed catalyst system was 4800.

The autoclave was pressurized again with 10.5 bar-g argon, 0.5 bar-g hydrogen and ethylene until a total pressure of 20.5 bar-g was reached; after 60 minutes of ethylene feeding, maintaining the reactor pressure at 20.5 bar-g, the polymerization was stopped, the reactor was depressurized and cooled. The polymer was taken from the reactor, dried under reduced pressure and separated from the initial charge by sieving. 125 g of polyethylene were obtained.

The process conditions and the properties of the obtained polymer are reported in Tables 1 and 2 below.

EXAMPLE 5

Ethylene Polymerization 80 g polyethylene powder having a particle size higher than 1 mm (sieved fraction, dried for 24 hours at 80° C. and stored under argon), were loaded under vacuum to a 1 L steal autoclave, and then heated up to 70° for 30 minutes, under vacuum.

The reactor was pressurized at 1 bar-a with argon and 1 ml Costelan® AS 100-solution (obtained by providing 0.55 ml Costelan® AS 100, from Costenoble, and filling with heptane to 100 ml) was fed to the reactor and stirred for 10 minutes.

1 ml of a TIBA solution in toluene (0.771 mol/L TIBA) was fed to the reactor and stirred for 10 minutes.

33 mg of the mixed catalyst system prepared in Example 3 were injected as a free flowing powder. The reactor was heated to 70° C. and pressurized with 10 bar argon and 0.5 bar hydrogen until a 10.5 bar-g as total pressure. The molar ratio of Al of TIBA to iron of the mixed catalyst system was 810.

Ethylene was fed into the reactor until a total pressure of 20.5 bar-g; after 60 minutes of continuous ethylene feeding, maintaining the reactor pressure at 20.5 bar-g, the polymerization was stopped by flashing out the monomers up to 0.5 bar-g.

Without discharging the polymer, 10 mL of a TIBA solution in toluene (0.771 mol/L TIBA) were fed to the reactor and stirred for 10 minutes; the molar ratio of Al of TIBA to iron of the mixed catalyst system was 8100.

The autoclave was pressurized again with 10.5 bar-g argon, 0.5 bar-g hydrogen and ethylene until a pressure of 20.5 bar-g was reached. After 60 minutes of ethylene feeding (21 L ethylene), maintaining the reactor pressure at 20.5 bar-g, the polymerization was stopped, the reactor was depressurized and cooled. The polymer was taken from the reactor, dried under reduced pressure and separated from the initial charge by sieving. 102 g polyethylene were obtained.

The process conditions and the properties of the obtained polymer are reported in Tables 1 and 2 below.

EXAMPLE 6

Ethylene Polymerization 80 g polyethylene powder having a particle size higher than 1 mm (sieved fraction, dried for 24 hours at 80° C. and stored under argon), were loaded under vacuum to a 1 L steal autoclave, and then heated up to 70° for 30 minutes, under vacuum.

The reactor was pressurized at 1 bar-a with argon and 1 ml Costelan® AS 100-solution (obtained by providing 0.55 ml Costelan® AS 100, from Costenoble, and filling with heptane to 100 ml) was fed to the reactor and stirred for 10 minutes.

1 ml of a TIBA solution in toluene (0.771 mol/L TIBA) was fed to the reactor and stirred for 10 minutes.

50 mg of the mixed catalyst system prepared in Example 3 were injected as a free flowing powder. The reactor was heated to 70° C. and pressurized with 10 bar argon and 0.5 bar hydrogen until a 10.5 bar-g as total pressure. The molar ratio of Al of TIBA to iron of the mixed catalyst system was 540.

Ethylene was fed into the reactor until a pressure of 20.5 bar-g; after 60 minutes of continuous ethylene feeding, maintaining the reactor pressure at 20.5 bar-g, the polymerization was stopped by flashing out the monomers up to 0.5 bar-g.

Without discharging the polymer, 10 mL of a TIBA solution in toluene (0.771 mol/L TIBA) were fed to the reactor and stirred for 10 minutes; the molar ratio of Al of TIBA to iron of the mixed catalyst system was 5400.

The autoclave was pressurized again with 10.5 bar-g argon, 0.5 bar-g hydrogen and 10 bar-g ethylene, until a pressure of 20.5 bar-g was reached; after 60 minutes of ethylene feeding, maintaining the reactor pressure at 20.5 bar-g, the polymerization was stopped, and the reactor was depressurized and cooled. The polymer was discharged from the reactor, dried under reduced pressure and separated from the initial charge by sieving. 67 g polyethylene were obtained.

The process conditions and the properties of the obtained polymer are reported in Tables 1 and 2 below.

COMPARATIVE EXAMPLE 1

Ethylene Polymerization 80 g polyethylene powder having a particle size higher than 1 mm (sieved fraction, dried for 24 hours at 80° C. and stored under argon), were loaded under vacuum to a 1 L steal autoclave, and then heated up to 70° for 30 minutes, under vacuum.

The reactor was pressurized at 1 bar-a with argon and 1 ml Costelan® AS 100-solution (obtained by providing 0.55 ml Costelan® AS 100, from Costenoble, and filling with heptane to 100 ml) was fed to the reactor and stirred for 10 minutes.

1 ml of a TIBA solution in toluene (0.771 mol/L TIBA) was fed to the reactor and stirred for 10 minutes.

32 mg of the mixed catalyst system prepared in Example 3 were injected as a free flowing powder.

The reactor was heated to 70° C. and pressurized with 10 bar argon and 0.5 bar hydrogen until a 10.5 bar-g as total pressure. The molar ratio of Al of TIBA to iron of the mixed catalyst system was 840.

Ethylene was fed into the reactor until a pressure of 20.5 bar-g was reached (about 5 L) and the polymerization was started; during the ethylene feeding, 10 ml 1-hexene were fed.

After 60 minutes of continuous ethylene feeding, maintaining the reactor pressure at 20.5 bar-g, the polymerization was stopped by flashing out the monomers, the reactor was depressurized and cooled. The polymer was taken from the reactor, dried under reduced pressure and separated from the initial charge by sieving. 32 g polyethylene were obtained.

After 60 minutes of continuous ethylene feeding, maintaining the reactor pressure at 20.5 bar-g, the polymerization was stopped by flashing out the monomers, the reactor was depressurized and cooled. The polymer was discharged from the reactor, dried under reduced pressure and separated from the initial charge by sieving. 44 g polyethylene were obtained.

The process conditions and the properties of the obtained polymer are reported in Tables 1 and 2 below.

TABLE 1

| Example | Catalyst [mg] | TIBA [ml] | 1-hexene [ml] | Polym time [min] | Polym T [° C.] | Yield [g] | Activity [kg/g/h] |
|---|---|---|---|---|---|---|---|
| Ex. 4 | 56 | 1 + 10 | 0 | 60 + 60 | 70 | 125 | 1.1 |
| Ex. 5 | 33 | 1 + 10 | 0 | 60 + 60 | 70 | 102 | 1.5 |
| Ex. 6 | 50 | 1 + 10 | 0 | 60 + 60 | 70 | 67 | 0.7 |
| Comp. Ex. 1 | 32 | 1 | 10 | 60 | 70 | 32 | 1.0 |
| Comp. Ex. 2 | 28 | 10 | 10 | 60 | 70 | 44 | 1.6 |

TABLE 2

| Example | $M_w \cdot 10^{-3}$ [g/mol] | $M_w/M_n$ | Density [g/cm$^3$] | Tot. CH$_3$ [1/1000 C] | Trans double bonds [1/1000 C] | Vinyl double bonds [1/1000 C] | Hexene [% wt] |
|---|---|---|---|---|---|---|---|
| Ex. 4 | 238.3 | 20 | 0.960 | <0.01 | 0.81 | 0.14 | — |
| Ex. 5 | 271.3 | 25 | 0.961 | <0.01 | 0.91 | 0.20 | — |
| Ex. 6 | 138.1 | 19 | 0.964 | <0.01 | 1.22 | 0.18 | — |
| Comp. Ex. 1 | 60.7 | 12 | 0.966 | 0.01 | 1.90 | 0.21 | <0.8 |
| Comp. Ex. 2 | 275.7 | 26 | 0.943 | <0.01 | 0.29 | 0.23 | 1.2 |

The process conditions and the properties of the obtained polymer are reported in Tables 1 and 2 below.

COMPARATIVE EXAMPLE 2

Ethylene Polymerization 80 g polyethylene powder having a particle size higher than 1 mm (sieved fraction, dried for 24 hours at 80° C. and stored under argon), were loaded under vacuum to a 1 L steal autoclave, and then heated up to 70° for 30 minutes, under vacuum.

The reactor was pressurized at 1 bar-a with argon and 1 ml Costelan® AS 100-solution (obtained by providing 0.55 ml Costelan® AS 100, from Costenoble, and filling with heptane to 100 ml) was fed to the reactor and stirred for 10 minutes.

10 ml of a TIBA solution in toluene (0.771 mol/L TIBA) was fed to the reactor and stirred for 10 minutes.

28 mg of the mixed catalyst system prepared in Example 3 were injected as a free flowing powder. The reactor was heated to 70° C. and pressurized with 10 bar argon and 0.5 bar hydrogen until a 10.5 bar-g as total pressure. The molar ratio of Al of TIBA to iron of the mixed catalyst system was 9600.

Ethylene was fed into the reactor until a pressure of 20.5 bar-g (about 5 L) was reached, and the polymerization was started; during the ethylene feeding, 10 ml 1-hexene were fed.

Comparative Examples 1 and 2 shows that it is possible to selectively control the activity of the different polymerization catalysts used in the process of the invention by varying the amount of activating compound. Therefore, by varying such amount, it is possible to control to control the molecular weight and the comonomer composition of the obtained polyethylene fractions, as shown in Example 4-6.

The invention claimed is:

1. A multistage process for the homo or copolymerization of olefins, comprising polymerizing ethylene and optionally one or more higher alpha-olefins in at least two polymerization steps, in the presence of a catalyst system comprising:
    at least one polymerization catalyst (A) based on a late transition metal component having a tridentate ligand which bears at least two ortho,ortho-disubstituted aryl radicals,
    at least one Ziegler polymerization catalyst (B), and
    at least a Lewis acid activating compound (C),
    wherein the molar ratio of the metal in the activating compound (C) to the late transition metal of catalyst (A) is different in the at least two polymerizations steps.
2. The multistage process of claim 1, comprising:
    a first polymerization step wherein the molar ratio of the metal in the activating compound (C) to the late transition metal of catalyst (A) ranges from 1,500:1 to 1:1, and a second polymerization step wherein the molar ratio of the metal in the activating compound (C) to the late transition metal of catalysts (A) ranges from 10,000:1 to 1,500:1.

3. The multistage process of claim 1, wherein the molar ratio of the transition metal of the Ziegler catalyst (B) to the late transition metal of catalyst (A) ranges from 500:1 to 1:100.

4. The multistage process of claim 3, wherein the molar ratio of the transition metal of the Ziegler catalyst (B) to the late transition metal of catalyst (A) ranges from 100:1 to 1:50.

5. The multistage process of claim 1, wherein:
in the first polymerization step, catalyst (A) produces more than 20% wt. of the polymer produced in the first step; and
in the second polymerization step, the Ziegler catalyst (B) produces more than 20% wt. of the polymer produced in the second step.

6. The multistage process of claim 1, wherein the first and second polymerization steps are carried out in two reactors operating in series.

7. The multistage process of claim 1, wherein the catalyst system is supported on one or more inorganic oxides.

8. The multistage process of claim 1, wherein catalyst (A) is activated by one or more aluminoxanes.

9. The multistage process of claim 1, wherein catalyst (A) has formula (I):

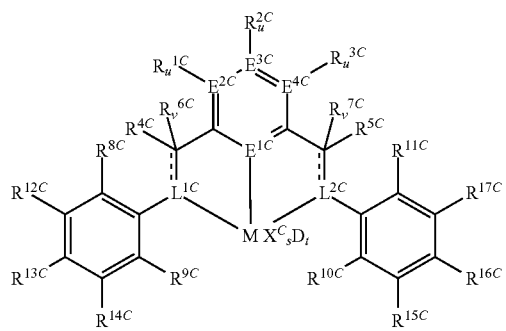

wherein:
M is Fe or Co,
$E^{1C}$ is nitrogen or phosphorus,
$E^{2C}$-$E^{4C}$ are each, independently of one another, carbon, nitrogen or phosphorus,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^3$ may be joined to form a five-, six- or seven-membered heterocycle comprising at least one atom selected from the group consisting of N, P, O and S,
$R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{7C}$ may be substituted by halogens and/or two geminal or vicinal radicals $R^{4C}$-$R^{7C}$ may be joined to form a five-, six- or seven-membered ring and/or two geminal or vicinal radicals $R^{4C}$-$R^{9C}$ may be joined to form a five-, six- or seven-membered heterocycle comprising at least one atom selected from the group consisting of N, P, O and S and, when v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical or a halogen,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may be joined to form a five-, six- or seven-membered ring and/or two vicinal radicals $R^{8C}$-$R^{17C}$ are joined to form a five-, six- or seven-membered heterocycle comprising at least one atom selected from the group consisting of N, P, O and S,
v is independently 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having from 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BE_4^-$, $PF_6^-$ or bulky noncoordinating anions and the radicals $X^C$ may optionally be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also be substituted by halogens or nitrogen- and oxygen-comprising groups and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also be substituted by halogens or nitrogen-and oxygen-comprising groups and two radicals $R^{19C}$ may also be joined to form a five- or six-membered ring,
s is 1, 2, 3 or 4,
D is an uncharged donor and
t is from 0 to 4.

10. The multistage process of claim 9, wherein $R^{8C}$, $R^{10C}$ are each, independently of one another, halogen, and
$R^{9C}$, $R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, where the organic radicals $R^{9C}$, $R^{11C}$ may also be substituted by halogen.

11. The multistage process of claim 9, wherein $R^{13C}$ and $R^{16C}$ are each, independently of one another, hydrogen, $C_1$-$C_{22}$-alkyl or halogen.

12. The multistage process of claim 9, wherein catalyst (A) has formula (IIa):

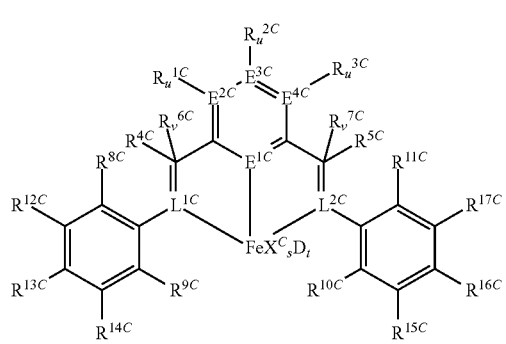

wherein the variables have the meanings reported in claim 9.

13. The multistage process of claim 12, wherein $R^{13C}$ and $R^{16C}$ are each, independently of one another, hydrogen, $C_1$-$C_{22}$-alkyl or halogen.

14. The multistage process of claim 1, wherein the Ziegler catalyst (B) comprises a compound of titanium or vanadium and a compound of magnesium, supported on an inorganic oxide.

15. The multistage process of claim 1, wherein the activating compounds (C) is a Lewis acid of general formula (III)

$$M^{2D}X^{1D}X^{2D}X^{3D} \quad (III)$$

wherein $M^{2D}$ is an element of group 13 of the Periodic Table of the Elements, $X^{1D}$, $X^{2D}$ and $X^{3D}$ are each, independently of one another, hydrogen, $C_1$-$C_{10}$-alkyl, $C_6$-$C_{15}$-aryl, alkylaryl, aryl alkyl, halo alkyl or haloaryl having from 1 to 10 carbon atoms in the alkyl radical and from 6 to 20 carbon atoms in the aryl radical, or fluorine, chlorine, bromine or iodine.

16. The multistage process of claim 15, wherein $M^{2D}$ is B, Al or Ga.

17. The multistage process of claim 16, wherein the activating compounds (C) is selected from the group consisting of trimethylaluminum, triethylaluminum, triisobutylaluminum, trioctylaluminum, methyldiethylaluminum and mixtures thereof.

18. The multistage process of claim 17, wherein the activating compounds (C) is selected from the group consisting of trimethylaluminum, triethylaluminum, triisobutylaluminum and mixtures thereof.

19. The multistage process of claim 1, for producing a polyethylene having density ranging from 0.900 to 0.970 g/cm³, $M_w$ of 100,000-900,000 g/mol and $M_w/M_n$ of at least 12.

20. The multistage process of claim 1, for producing a multimodal polyethylene comprising:
at least an ethylene homopolymer or a copolymer of ethylene with up to 2% mol. of a higher alpha-olefin, having density of 0.950-0.975 g/cm³, $M_w$ of 10,000-100,000 g/mol and $M_w/M_n$ between 3 and 15, and
at least an ethylene homopolymer or a copolymer of ethylene with up to 15% mol, having a density of 0.870-0.955 g/cm³, $M_w$ of 100,000-2,000,000 g/mol and $M_w/M_n$ between 8 and 80.

* * * * *